(12) United States Patent
Root et al.

(10) Patent No.: US 6,754,585 B2
(45) Date of Patent: *Jun. 22, 2004

(54) INTERACTIVE WEATHER ADVISORY SYSTEM

(75) Inventors: Steven A. Root, Edmond, OK (US); Michael R. Root, Edmond, OK (US)

(73) Assignee: Weatherbank, Inc., Edmond, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/322,187

(22) Filed: Dec. 16, 2002

(65) Prior Publication Data

US 2003/0125876 A1 Jul. 3, 2003

Related U.S. Application Data

(63) Continuation of application No. 09/624,668, filed on Jul. 24, 2000, now Pat. No. 6,505,123.

(51) Int. Cl.$^7$ .......................................... G06F 169/00
(52) U.S. Cl. ......................................................... 702/3
(58) Field of Search ........................ 702/3, 4, 5; 342/26, 342/460

(56) References Cited

U.S. PATENT DOCUMENTS

| | | |
|---|---|---|
| 5,398,021 A | 3/1995 | Moore |
| 5,481,254 A | 1/1996 | Gaskill et al. |
| 5,555,446 A | 9/1996 | Jasinski |
| 5,790,953 A | 8/1998 | Wang et al. |
| 5,867,109 A | 2/1999 | Wiedeman |
| 5,867,110 A | 2/1999 | Naito et al. |
| 5,948,041 A | 9/1999 | Abo et al. |
| 5,963,130 A | 10/1999 | Schlager et al. |
| 5,999,126 A | 12/1999 | Ito |
| 6,018,699 A | 1/2000 | Baron et al. |
| 6,028,514 A | 2/2000 | Lemelson et al. |
| 6,043,756 A | 3/2000 | Bateman et al. |
| 6,047,327 A | 4/2000 | Tso et al. |
| 6,091,959 A | 7/2000 | Souissi et al. |
| 6,240,369 B1 * | 5/2001 | Foust ............................ 702/3 |
| 6,360,172 B1 * | 3/2002 | Burfeind et al. ................ 702/2 |
| 6,501,392 B2 | 12/2002 | Gremmert et al. |
| 6,505,123 B1 * | 1/2003 | Root et al. ...................... 702/3 |

FOREIGN PATENT DOCUMENTS

WO          9741654          11/1997

* cited by examiner

Primary Examiner—Donald McElheny, Jr.
(74) Attorney, Agent, or Firm—Dunlap, Codding & Rogers, P.C.

(57) ABSTRACT

A broadcast network for selectively transmitting individualized weather output signals to remote communicator devices. The broadcast network is comprised of a user input database, a communicator location database, a weather information database, a weather analysis unit and a communication network. The user input database contains user-defined parameters and each of the user-defined parameters includes a user profile. The user profile in each of the user-defined parameters utilizes a user identifier code and identifies a communicator device associated with a particular user. The communicator location database contains real-time data indicative of the spatial locations of the communicator devices. The weather information database contains real-time weather data for the spatial locations contained in the communicator location database. The weather analysis unit repeatedly compares the spatial location of each communicator device contained in the communicator location database with the real-time weather data and generates an individualized weather output signal.

38 Claims, 2 Drawing Sheets

INTERACTIVE WEATHER ADVISORY SYSTEM

CROSS-REFERENCE TO RELATED APPLICATIONS

This application is a continuation of U.S. Ser. No. 09/624,668, filed on Jul. 24, 2000, now U.S. Pat. No. 6,505,123 the entire content of which is hereby expressly incorporated herein by reference.

STATEMENT REGARDING FEDERALLY SPONSORED RESEARCH OR DEVELOPMENT

Not applicable.

BACKGROUND OF THE INVENTION

During recent years, the demand for detailed weather information has risen sharply. Personal computers and communication devices have increased the demand for more information because of their power to gather, manipulate, transmit and receive data. As a result, specialized information and value-added services are in great demand. End users no longer desire to gather, manipulate and evaluate raw data. Nowhere is this condition more apparent than with weather services across North America.

Years ago, radio and television broadcasters recognized an increasing demand for weather information from their audience, and thus increased the number of on-air weather segments as a means for increasing market ranking. Today, the demand for specific content in weather information has exceeded the ability of broadcasters to meet this demand. Virtually every facet of business and personal activities are continually influenced by the weather, good or bad.

In the United States as in most countries, a governmental agency (the National Weather Service in the United States), has the primary responsibility of generating weather products for the general public. These products, such as advisories, statements, and forecasts are generated and made available to third parties, such as broadcasters, newspapers, internet web sites, paging companies and others who, in turn, distribute them to the public. However, this chain of data custody is one way.

Today's lifestyles are fast-paced and sophisticated. Requests for detailed weather information for specific applications outnumber the governments' ability to process them. However, adhering to their mandated responsibility, the National Weather Service generates the general products for public consumption twice daily. This condition forces the public to interpret general and outdated advisories to meet their needs. Often, this interpretation is made erroneously. Even worse, these products are usually regional or national in scope, and may not apply to a particular location where various local activities are underway.

By way of example, weather warnings are broadcast by radio stations across the United States. These warnings identify certain weather impacts within a specified area. In most cases, the warning area includes one or more counties, covering dozens to hundreds of square miles. Most often, these threats (such as severe thunderstorms, tornadoes, etc.), only impact a very small zone within the warning area. These threats also move rapidly. As impacts approach specific zones, they are in fact, moving away from other zones, inside the total warning area. Essentially, the existing reporting system is insufficient to specifically identify and adequately warn of personal risk. Furthermore, if the threat is imminent, the existing system cannot and does not provide preventive measures for each user near or at the threat. Thus, by default, distant or unaffected users are placed "on alert" unnecessarily when the threat may be moving away from their location.

Another common example further clarifies the problem. A family, excited to attend the championship softball game this upcoming weekend, closely monitors the local weather forecast. All week-long the forecast has advised fair to partly cloudy weather for game day. Early on game day, the forecast changes to partly cloudy, with a thirty percent chance for late afternoon showers. The family decides to attend the game, believing that the chances for rain are below their perceived risk level. Unknown to the family at midday, some clusters of showers are intensifying, and will place dangerous lightning over the game field. While the morning weather report was not completely inaccurate, the participants and spectators are exposed to risk. If later asked, it is likely the family members did not hear or remember the weather forecast. They also failed to link their limited knowledge of the weather to their own needs and risk exposure. They did not monitor changing weather events. Most likely, they had no ability to monitor developing risk at the game. Clearly, these people were forced to interpret outdated, limited information, as applied to their specific application.

Therefore, a need exists for a system to automatically and continuously provide consumer customized weather reports, advisories, alerts, forecasts and warnings relevant to a consumer-defined level of need or dynamic spatial location. It is to such a system that the present invention is directed.

SUMMARY OF THE INVENTION

The present invention provides an interactive weather advisory system and method of delivering individualized weather information. More specifically the present invention relates to a broadcast network for selectively transmitting individualized weather output signals to remote communicator devices. The broadcast network includes a user input database, a communicator location database, a weather analysis unit and a communication network.

The user input database contains user-defined parameters and each of the user-defined parameters desirably includes a spatial range identifier and a user profile. The user profile in each of the user-defined parameters at least identifies a communicator device associated with a particular user. The communicator location database contains real-time data indicative of the spatial locations of the communicator devices. In one preferred version of the present invention, the communicator location database is automatically and/or continuously updated by the communicator devices.

The weather information database contains real-time weather data for at least the spatial locations contained in the communicator location database. The term "weather data" describes a wide variety of weather products, including but not limited to: past and current conditions of weather events; textual products, graphic products, and the like. The weather analysis unit receives the real-time weather data from the weather information database and automatically and continuously compares the spatial range identifier included in the user-defined parameters and the spatial locations of the corresponding communicator devices contained in the communicator location database with the real-time weather data and upon demand of the user, or even continuously, generates an individualized weather output signal including weather information within the spatial range identified by the spatial range identifier for the user-defined parameters.

As new locations are defined by the communicator location database, the weather information database is automatically updated in real-time.

The communication network transmits each individualized weather output signal to the particular communicator device defined in the user profile included in the user-defined parameter corresponding with the real-time weather data and prediction of events. Thus, a user can receive weather information in real-time specific to the user's immediate spatial location regardless of whether or not the user's location remains fixed or dynamic throughout time.

Other advantages and features of the present invention will become apparent to those skilled in the art when the following detailed description is read in view of the attached drawings and appended claims.

DETAILED DESCRIPTION OF INVENTION

Figure 1:
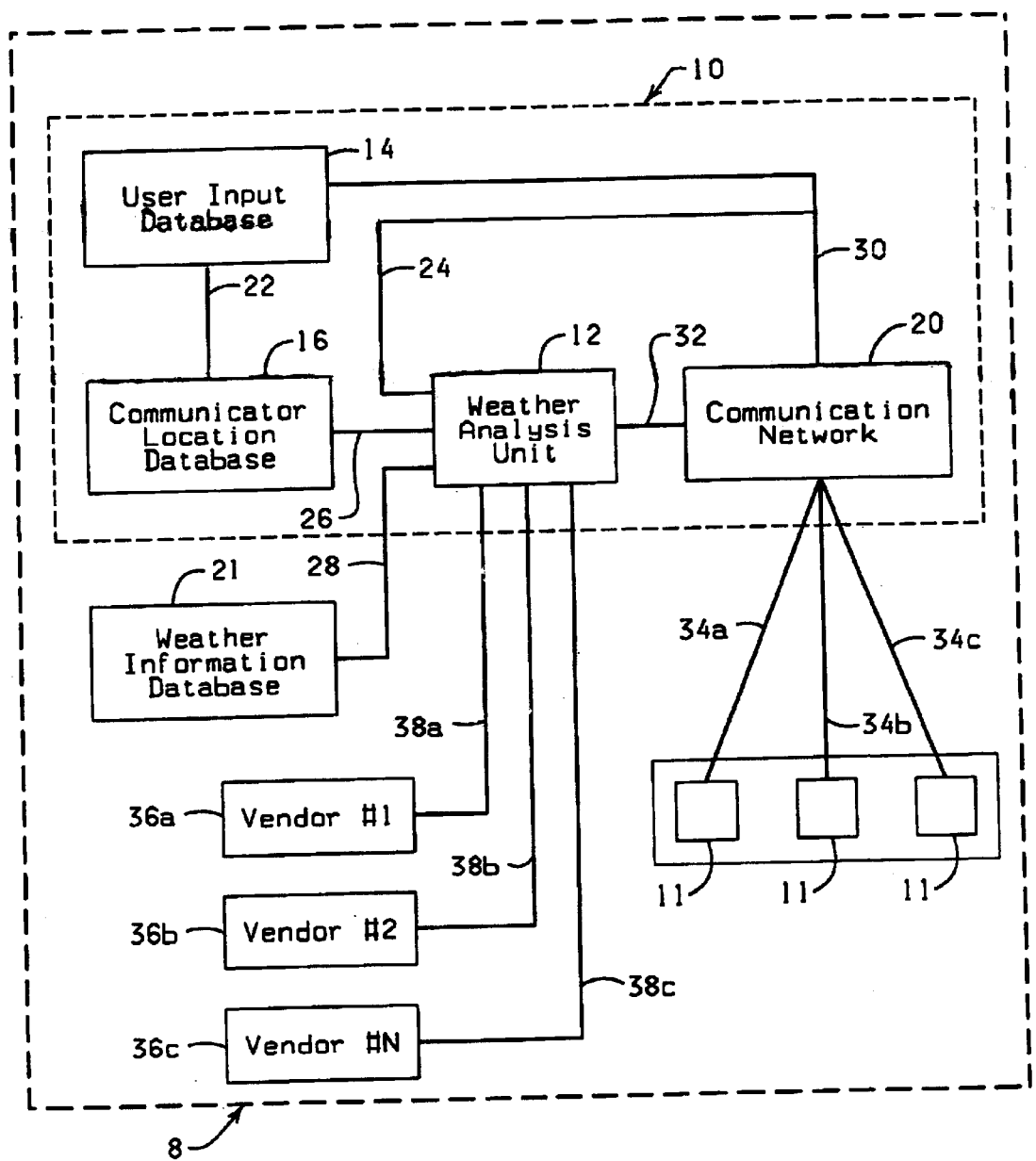
FIG. 1 is a block diagram of an interactive weather advisory system constructed in accordance with the present invention.

Referring now to the drawings and more particularly to FIG. 1 shown therein in block diagram form, is an interactive weather advisory system 8, constructed in accordance with the present invention. The weather advisory system 8 is provided with a broadcast network 10 for selectively transmitting individualized weather output signals to remote communicator devices 11. The broadcast network 10 includes a weather analysis unit 12, a user input database 14, a communicator location database 16, and a communication network 20. The weather analysis unit 12 receives real-time weather data from a weather information database 21. The weather information database 21 can be located at the broadcast network 10, or remotely from the broadcast network 10.

The weather analysis unit 12, the user input database 14, the communicator location database 16, the weather information database 21, and the communication network 20, interrelate and communicate via signal paths 22, 24, 26, 28, 30 and 32.

The user input database 14 permits a plurality of users to input data corresponding to the weather reports, advisories or forecasts such that individualized weather reports, advisories or prediction of events can be transmitted to each individual user. The user input database 14 contains data representative of at least one user-defined parameter correlated to each one of a plurality of users. In one version of the present invention, each of the user-defined parameters includes various information related to weather output signals, such as a spatial range identifier, a user profile, one or more weather content identifiers for identifying particular weather patterns, one or more time identifiers for identifying particular times or time intervals that a user may desire a weather product, a spatial location fixed or dynamic code, and a spatial location identifier for identifying particular spatial locations of interest to the user if the spatial location fixed or dynamic code indicates that the spatial location is to be fixed. The user profile in each of the user-defined parameters includes at least a user identifier code for identifying a particular communicator device 11 associated with a particular user.

For instance, the user identifier code could be a mobile telephone number identifying one of the communicator devices 11, which in this instance could be a mobile telephone or a pager, for example. The weather content identifier could be a computer code to identify one or a variety of weather conditions or events such as tornadoes, thunderstorms, hail storms, lightning storms, showers, snow storms, blizzards, high winds, winds aloft, rapidly rising or rapidly falling barometric pressure or other such weather patterns or conditions. The time identifier desirably could be a computer code for identifying the particular time, times, or time intervals the user desires the interactive weather advisory system 8 to communicate weather data to the user or to monitor the real-time weather data for a particular time and/or date. The spatial location identifier 26 could be a computer code identifying a particular predetermined spatial location such as, by way of example but not limitation, a longitude and latitude anywhere in the world, a town, a county, a township, address, zip code, altitude and combinations thereof.

As discussed above, the spatial location identifier identifies a particular spatial location anywhere in the world and/or altitude above sea level. The spatial range identifier identifies a particular spatial range surrounding the spatial location identifier. Each of the users can select the spatial location identifier and the spatial range identifier so as to receive weather forecasts and/or weather advisories or any other weather information for the spatial location identified by the spatial location identifier, and within the spatial range identified by the spatial range identifier.

Figure 2:
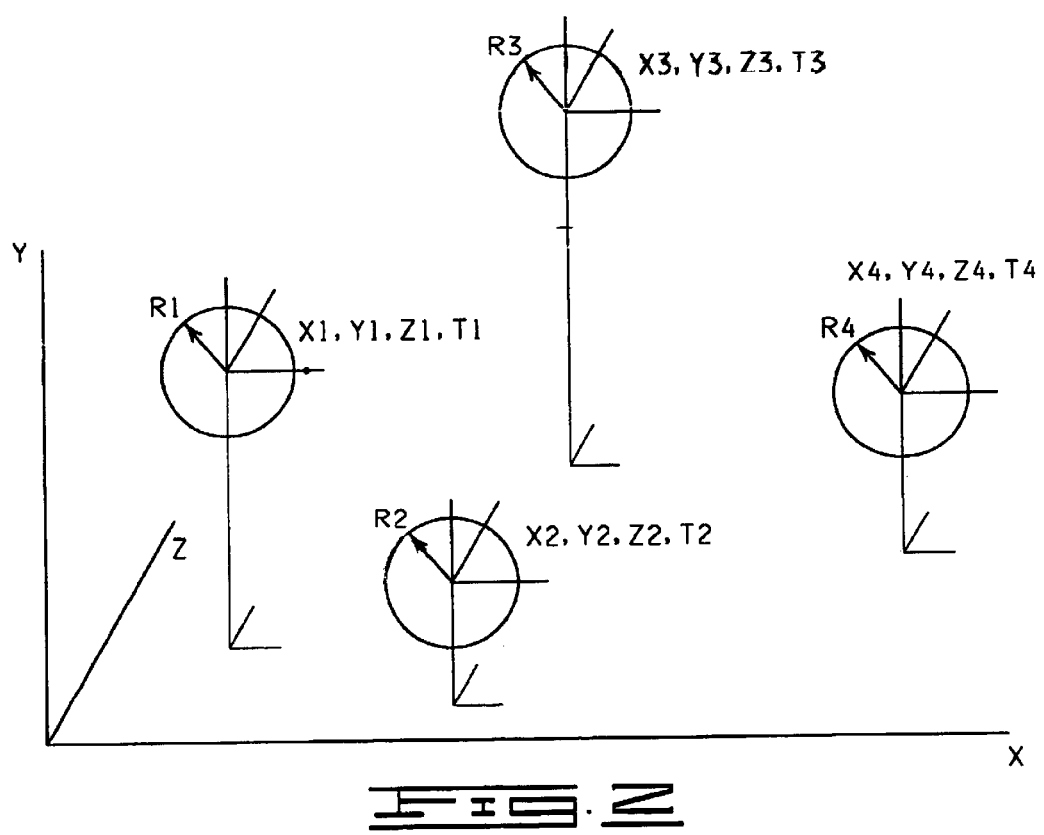
FIG. 2 is a coordinate system illustrating a spatial location identifier and a spatial range identifier utilized by versions of the present invention.

For example, referring to FIG. 2, shown therein is a coordinate system illustrating four spatial location identifiers and four spatial range identifiers selected by different users of the present invention. That is, one of the users selects the spatial location identifier (X1, Y1, Z1), and the spatial range identifier (R1). Another one of the users selects the spatial location identifier (X2, Y2, Z2), and the spatial range identifier (R2).

The user who selected the spatial location identifier (X1, Y1, Z1) and the spatial range identifier R1 will receive weather products and advisories concerning the spatial range identified by the spatial location identifier (X1, Y1, Z1) and the spatial range identifier R1, as predefined in his user input database. The user who selected the spatial location identifier (X2, Y2, Z2) and the spatial range identifier R2 will receive weather products and advisories concerning the spatial range identified by the spatial location identifier (X2, Y2, Z2) and the spatial range identifier R2, and as predefined in the user input database 14. Likewise, the users who selected the spatial location identifiers (X3, Y3, Z3) and (X4, Y4, Z4) and the spatial range identifiers R3 and R4 will receive weather products and advisories concerning the spatial range identified by the spatial location identifiers (X3, Y3, Z3), (X4, Y4, Z4) and the spatial range identifier R3, R4, and as predefined in the user input database 14.

The magnitudes of the spatial range identifiers R1, R2, R3 and R4 can be different or the same. In addition, the magnitudes of the spatial range identifiers R1, R2, R3 and R4 can vary widely and is desirably selected by the users.

Particular users can input the user-defined parameters into the user input database 14 via any suitable method. For example, the user input database 14 is desirably configured to acquire its data from a variety of optional sources preferably chosen by the user, such as verbally through a telephone customer service network, a mobile phone network equipped with wireless application protocol technology, email, a personal digital assistant, a laptop computer, or an interactive web site. Furthermore, users could mail the user-defined parameters to the broadcast network 10 and an individual at the broadcast network 10 could input the user-defined parameters directly into the user input database 14 via a keyboard or other similar input device. In one embodiment, the user inputs the selected information into the user input database 14 via the user's communicator device 11.

The weather information database 21 contains real-time weather data for at least the spatial locations contained in the communicator location database 16 and the spatial locations identified by the spatial location identifier in the user input database 14. The weather analysis unit 12 generates predictions of all weather events based on the real-time weather data. The weather information database 21 desirably receives its real-time weather data from at least one of a plurality of possible resources such as, by way of example but not limitation, government weather information resources, privately operated weather information resources and other various meteorological resources. The real-time weather data could also be either inputted directly at the physical location of the weather information database 21 or inputted via a mobile phone network, a mobile phone network with wireless application protocol, the Internet, aircraft communication systems, email, a personal digital assistant, a laptop computer, regular computer, or other wireless devices.

The communicator location database 16 is an optional feature of the present invention, and is enabled via the signal path 22 when the user requests real-time weather advisories or prediction of events at the dynamic spatial location of the user's communicator device 11. The communicator location database 16 is continuously updated such that the communicator location database 16 contains real-time data indicative of the spatial locations of the communicator devices 11. In one embodiment, the user identifier code in the user's profile is transmitted to the communicator location database 16 via the signal path 22. The communicator location database 16 desirably receives data from the communicator devices 11 identified by the user identifier codes via at least one of a variety of possible resources such as a mobile phone network, a mobile phone network equipped with the wireless application protocol technology, global positioning satellite technology, the Internet, loran technology, radar technology, transponder technology or any other type of technology capable of tracking the spatial location of a communicator device 11 and communicating the location of such communicator device 11 to the communicator location database 16 of the broadcast network 10. Preferably, the communicator location database 16 is continuously and automatically updated as to the location of each of the communicator devices 11, such as by the wireless application protocol technology.

The communication network 20 can be, by way of example but not limitation, a mobile phone network, a mobile phone network with wireless application protocol technology, the Internet, a facsimile network, a satellite network (one or two-way), a RF radio network, or any other means of transmitting information from a source to an end user.

The communicator devices 11 can be bidirectional or unidirectional communicator devices. The communicator devices 11 can be, by way of example but not limitation, a portable device, such as a mobile telephone, a smart phone, a pager, a laptop computer or a personal digital assistant or any other electronic device capable of receiving weather information data. Furthermore, the communicator device 11 can be incorporated into an object that is utilized or accessible by the user, such as a helmet, an automobile, or an airplane, for example. While only three communicator devices 11 are represented in FIG. 1 for purposes of illustration, the interactive weather advisory system 8 contemplates the utilization of a large number of communicator devices 11.

The weather analysis unit 12 receives the data in the user input database 14, the communicator location database 16 and the weather information database 21 from the signal paths 24, 26, and 28. The weather analysis unit 12 can be, by way of example but not limitation, a computer desirably programmed to automatically and continuously compare the data in the user input database 14, communicator location database 16 and weather information database 21 so as to generate an individualized weather output signal including weather information within the spatial range identified by the spatial range identifier for each user-defined parameter in the user input database 14. The weather output signals are transmitted to the communication network 20 via the signal path 32.

The weather analysis unit 12 gathers the real-time weather data from the weather information database 21. The term "real-time weather data", as used herein, refers to weather data which is continually updated so as to indicate current or near current information. In some instances, the "real-time weather data" may be delayed by relatively small increments of five minutes, 15 minutes, or 30 minutes, for example. In other instances, the "real-time weather data" can be provided with substantially no delay. It is expected that the increments will become smaller as communication networks and weather related technology become faster.

The weather analysis unit 12 generates predictions of all weather related events and compares past and current events contained in the weather information database 21 (such as future position, strength, trajectory, etc.), to construct a four-dimensional database. Three dimensions of the database define a physical location on or above the earth's surface (the spatial location identifier (X1, Y1, Z1). The fourth dimension is time; past, present or future (identified as T1, T2, T3, T4). By employing high speed computer processors in real-time, the weather analysis unit 12 compares all events (past, current and predicted), at specific positions (X1, Y1, Z1, T1) with identical user supplied data (the user input database; X1, Y1, Z1, R1, T1), and identifies any matches (weather output signals) to the user through the communication network 20 and communication devices 11.

The communication network 20 receives the weather output signals and the user identification codes via the signal paths 32 and 30. In response thereto the communication network 20 transmits the individualized weather output signals to the communicator devices 11 associated with the user identification codes via the signal paths 34a, 34b and 34c such that each user receives the individualized weather information that was requested.

The signal paths 34a, 34b and 34c refer to any suitable communication link which permits electronic communications. For example, the signal paths 34a, 34b and 34c can be point-to-point shared and dedicated communications, infra red links, microwave links, telephone links, CATV links, satellite and radio links and fiber optic links.

Various combinations of weather information can be incorporated into the user input database 14 so as to provide the user with selected and specific weather information. For example, a user traveling in his automobile may wish to be informed by the interactive weather advisory system 8 concerning all hailstorms for an area within a 2.5 mile radius of his vehicle as he is traveling from his point of origin to his destination. The user, for example, through his smart phone (communicator device 11) in his vehicle working in conjunction with a mobile phone network (communication network 20) with wireless application protocol, inputs selected information into the user input database 14; namely, the user's smart phone number (user identifier code), hail (weather content identifier), 2.5 mile radius (spatial range identifier 24) and spatial location dynamic (spatial location of the user's smart phone is then automatically and continuously monitored), and the like.

The interactive weather advisory system 8 then monitors weather information and predictions of events in the weather analysis unit 12 and transmits the individualized weather output signal to the user's smart phone if a hailstorm is detected or is highly likely to form within a 2.5 mile radius of the vehicle along the vehicle's path of travel, for the duration of travel.

The individualized weather output signal can be an audio and/or video data signal. For example, the individualized weather output signal can be a .WAV file or other suitable file containing an animated representation of a real or hypothetical individual speaking an individualized message to the user. In the example given above, the individualized message may be that the hailstorm is 2.5 miles ahead of the vehicle and thus, the user should consider stopping for a short period of time so as to avoid the hailstorm. Alternatively, the individualized message may be that the hailstorm is 2.5 miles ahead of the vehicle and thus, the user should consider stopping until further notified by another individualized weather output signal so as to avoid the hailstorm. In other words, the weather analysis unit 12 may transmit another individualized weather output signal to the user via the communication network 20 and the communicator devices 11 notifying the user that the weather condition identified by the weather content identifier has passed or is beyond the spatial location identified by the spatial range identifier.

As another example, a user may desire to be informed of all real-time weather data and predictions of events within a particular spatial range of a particular dynamic spatial location. For instance, the user may be interested in whether his aircraft is at risk of icing as he flies from Oklahoma City to Tulsa, Okla. To provide a suitable level of comfort and safety, the user may wish to be informed of icing conditions within 10 miles of the dynamic spatial location of his aircraft. The user, for example, through his smart phone or other suitable avionic device (communicator device 11) in his aircraft working in conjunction with a mobile phone network (communication network 20) with wireless application protocol, inputs selected information into the user input database 14; namely, the user's smart phone number (user identifier code), icing (weather content identifier), 10 mile radius (spatial range identifier 24) and the spatial location dynamic. The spatial location of the user's smart phone or other suitable avionic device is then automatically and continuously monitored as the aircraft traverses through time and space from (X1, Y1, Z1, T1) to (X4, Y4, Z4, T4). The interactive weather analysis unit 12 then monitors the real-time weather data in the weather information database 21 and the predicted events in the weather analysis unit 12 so as to transmit the individualized weather output signal to the user's smart phone or other avionic device identifying, if icing is detected or is highly likely to form relevant to a 10 mile radius of the aircraft.

As yet another example, perhaps the user is only interested in a particular weather pattern at a particular fixed spatial location and within a particular spatial range irrespective of the immediate location of the communicator device 11. To accomplish this user's request, the broadcast network 10 does not utilize the communicator location database 16. The user inputs selected information into the user input database 14, namely the user's phone number (user identifier code), the code for the particular weather pattern in which the user is interested (weather content identifier), the spatial range around the spatial location in which the user is interested (spatial range identifier) and the spatial location in which the user is interested (spatial location identifier). The weather analysis unit 12 then monitors the real-time weather data in the weather information database 21 and the predicted events in the weather analysis unit 12 so as to transmit the individualized weather information concerning the weather pattern in the spatial location and range requested by the user.

As a further example, perhaps the user is only interested in a particular weather condition at the spatial location and within a particular spatial range at a particular time. The user inputs selected information into the user input database 14, namely, the user's phone number (user identifier code), the code for the particular weather pattern in which the user is interested (weather content identifier), the spatial range around the spatial location in which the user is interested (spatial range identifier and the spatial location in which the user is interested spatial location identifier) and the time and date (time identifier) that the user to wishes to be informed of the weather conditions at the spatial location of interest. In response thereto, the weather analysis unit 12 monitors the real time weather data from the weather information database 21 for the spatial location and range identified by the spatial range identifier and spatial location identifier to determine the probability of the particular weather pattern occurring at the time identified by the time identifier. The weather analysis unit 12 sends, via the signal path 32, the individualized weather output signal to the communication network 20. The communication network 20 receives the user identifier code, via signal path 30, from the user input database 14 and transmits the weather output signal received from the weather analysis unit 12 to the particular communicator device 11 identified by the user identifier code. Thus, the user receives the individualized weather information concerning the spatial location, spatial range and time requested by the user.

The signal paths 22, 24, 26, 28, 30 and 32 can be logical and/or physical links between various software and/or hardware utilized to implement the present invention. It should be understood that each of the signal paths 22, 24, 26, 28, 30 and 32 are shown and described separately herein for the sole purpose of clearly illustrating the information and logic being communicated between the individual components of the present invention. In operation, the signal paths may not be separate signal paths but may be a single signal path. In addition, the various information does not necessarily have to flow between the components of the present invention in the manner shown in FIG. 1. For example, although FIG. 1 illustrates the user identifier code being transmitted directly from the user input database 14 to the communication network 20 via the signal path 30, the user identifier code can be communicated to the weather analysis unit 12 via the signal path 24 and then communicated to the communication network 20 via the signal path 32.

It should be understood that although the user has been described as manually inputting the user identifier code into the user input database 14, the user identifier code could be automatically input into the user input database 14 by the communicator device 11.

Once the user-defined parameters have been input into the user input database 14, the user-defined parameters can be analyzed by the weather analysis unit 12 along with weather content identifiers for purposes of targeted marketing. A plurality of vendors 36 can be provided access to the weather analysis unit 12 of the broadcast network 10 via a plurality of signal paths 38a, 38b, and 38c. The vendors 36 can independently input search information into the weather analysis unit 12 for compiling a data set of information which is useful to the vendors 36.

For example, a particular vendor 36a, who is in the business of selling snow blowers, may input a weather content identifier and time identifier into the weather analysis unit 12 so as to request a list of all spatial locations in the United States which are expected to receive at least 10 inches of snow in the next week. The weather analysis unit 12 would then compile the data set of all spatial locations in United States which is expected to receive at least 10 inches of snow in the next week based on at least one weather content identifier, the time identifier, and the real-time weather data stored in the weather information database 21. The data set is then output to the vendor 36a. Based on the data set, the vendor 36a may send advertisements or additional snow blowers to the areas identified in the data set.

As another example, the particular vendor 36a, who is in the business of selling snow blowers, may input a weather content identifier and time identifier into the weather analysis unit 12 so as to request a list of all user profiles identifying users who resided in spatial locations in the United States which are expected to receive at least 10 inches of snow in the next week. The weather analysis unit 12 would then compile the data set of all spatial locations in United States which is expected to receive at least 10 inches of snow in the next week based on at least one weather content identifier, the time identifier, the user profiles and the real-time weather data stored in the weather information database 21. The data set is then output to the vendor 36a. Based on the data set, the vendor 36a may send advertisements to the users who are identified in the data set.

It is envisioned that users will subscribe to the services provided by the broadcast network 10. In this regard, the broadcast network 10 may or may not charge a service fee to the users. In addition, some services may be provided by the broadcast network 10 for one charge and additional services may be provided at an enhanced charge.

To save processing power, the weather analysis unit 12 may periodically determine which communicator devices 11 are turned off or out of range. Once this has been determined, the weather analysis unit 12 would then not generate any individualized weather output signals for the communicator devices 11 which are turned off or out of range. Once a particular one of the communicator devices 11 is turned on or comes within range, the weather analysis unit 12 would then attempt to generate individualized weather output signals for such communicator devices 11. In other words, to save processing power the weather analysis unit 12 may only generate individualized weather output signals for the communicator devices 11 which are active and within range.

The weather analysis unit 12 can be located at the broadcast network 10. Alternatively, the weather analysis unit 12 can be separate from the remainder of the broadcast network 10 and provided as a service to the broadcast network 10.

From the above description, it is clear that the present invention is well adapted to carry out the objects and to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed.

What is claimed is:

1. A broadcast network for selectively transmitting individualized weather output signals to at least one of a plurality of communicator devices remotely located from the broadcast network, the broadcast network comprising:

a user input database containing a plurality of user-defined parameters with each of the user-defined parameters including a user profile, the user profile in each of the user-defined parameters including a user identifier code identifying a communicator device associated with a particular user;

a communicator location database containing real-time data indicative of the spatial locations of the communicator devices;

a weather analysis unit automatically and continuously comparing the spatial locations of the communicator devices contained in the communicator location database with real-time weather data to generate individualized weather output signals; and a communication network receiving the individualized weather output signals and transmitting the individualized weather output signals to the communicator devices identified by the user identifier codes.

2. The broadcast network of claim 1 wherein the communication network transmits individualized weather output signals to the particular communicator device via a mobile telephone network.

3. The broadcast network of claim 2 wherein at least one of the user identifier codes identifies a mobile phone.

4. The broadcast network of claim 2 wherein at least one of the user identifier codes identifies a pager.

5. The broadcast network of claim 2 wherein at least one of the user identifier codes identifies a laptop computer.

6. The broadcast network of claim 2 wherein at least one of the user identifier codes identifies a personal digital assistant.

7. The broadcast network of claim 1, wherein the individualized weather output signal includes a video data signal.

8. The broadcast network of claim 1, wherein the video data signal includes an animated graphic file.

9. The broadcast network of claim 7, wherein the video data signal is a .wav file.

10. A broadcast network for selectively transmitting individualized weather output signals to a plurality of communicator devices remotely located from the broadcast network, the broadcast network comprising:

a user input database containing a plurality of user-defined parameters with each of the user-defined parameters including at least one spatial location identifier, and a user profile, the spatial location identifying a location above the ground, the user profile in each of the user-defined parameters including a user identifier code identifying a communicator device associated with a particular user and at least one weather content identifier;

a weather analysis unit automatically and continuously comparing the user-defined parameters with the real-time weather data and predictions of events so as to generate individualized weather output signal for a plurality of user-defined parameters responsive to the weather content identifiers corresponding to real-time weather data in the spatial location identified by the spatial location identifier; and a communication network receiving the user identifier codes in the user-defined parameters and transmitting the individualized weather output signals to the particular communicator devices identified by the user identifier codes.

11. The broadcast network of claim 10 wherein the communication network transmits individualized weather output signals to the particular communicator device via a mobile telephone network.

12. The broadcast network of claim 11 wherein at least one of the user identifier codes identifies a mobile phone.

13. The broadcast network of claim 11 wherein at least one of the user identifier codes identifies a pager.

14. The broadcast network of claim 11 wherein at least one of the user identifier codes identifies a laptop computer.

15. The broadcast network of claim 11 wherein at least one of the user identifier codes identifies a personal digital assistant.

16. A broadcast network for selectively transmitting individualized weather output signals to a plurality of communicator devices remotely located from the broadcast network, the broadcast network comprising:

a user input database containing a plurality of user-defined parameters with the user-defined parameters including at least one spatial location identifier, a time identifier, a weather content identifier, and a user profile, the spatial location identifier identifying a location a distance above the ground, the user profile in each of the user-defined parameters including a user identifier code identifying a communicator device associated with a particular user;

a weather analysis unit automatically and repeatedly comparing the user-defined parameters with the real-time weather data to generate an individualized weather output signal; and a communication network receiving the user identifier codes in the user-defined parameters and transmitting the individualized weather output signals to the communicator devices identified by the user identifier codes.

17. The broadcast network of claim 15 wherein the communication network transmits individualized weather output signals to the particular communicator device via a mobile telephone network.

18. The broadcast network of claim 16 wherein at least one of the user identifier codes identifies a mobile phone.

19. The broadcast network of claim 16 wherein at least one of the user identifier codes identifies a pager.

20. The broadcast network of claim 16 wherein at least one of the user identifier codes identifies a laptop computer.

21. The broadcast network of claim 16 wherein at least one of the user identifier codes identify a personal digital assistant.

22. A broadcast network for selectively transmitting individualized weather output signals to at least one of a plurality of communicator devices remotely located from the broadcast network, the broadcast network comprising:

a user input database containing a plurality of user-defined parameters with each of the user-defined parameters including a weather content identifier and a user profile, the user profile in each of the user-defined parameters including a user identifier code identifying a communicator device associated with a particular user;

a communicator location database containing real-time data indicative of the spatial locations of the communicator devices;

a weather analysis unit automatically and repeatedly comparing the weather content identifier included in each of the user-defined parameters and the spatial location of each communicator device contained in the communicator location database with real-time weather data to generate an individualized weather output signal including weather information; and a communication network receiving the user identifier codes in the user-defined parameters and the individualized weather output signals, the communication network transmitting each individualized weather output signal to the particular communicator devices identified by the user identifier codes.

23. The broadcast network of claim 22 wherein the communication network transmits individualized weather output signals to the particular communicator device via a mobile telephone network.

24. The broadcast network of claim 22 wherein at least one of the user identifier codes identifies a mobile phone.

25. The broadcast network of claim 22 wherein at least one of the user identifier codes identifies a pager.

26. The broadcast network of claim 22 wherein at least one of the user identifier codes identifies a laptop computer.

27. The broadcast network of claim 22 wherein at least one of the user identifier codes identifies a personal digital assistant.

28. The broadcast network of claim 22, wherein the individualized weather output signal includes a video data signal.

29. The broadcast network of claim 27, wherein the video data signal includes an animated graphic file.

30. The broadcast network of claim 27, wherein the graphic file includes a .wav file.

31. A method for providing weather information to a plurality of users located remotely from a broadcast network, comprising the steps of:

receiving a plurality of user-defined parameters by a user input database with at least two of the user-defined parameters including a weather content identifier and a user profile, each of the user profiles including a user identifier code identifying a communicator device associated with a particular user;

receiving real-time data indicative of the spatial locations of the communicator devices by a communicator location database;

comparing, automatically and continuously, the weather content identifier included in the user-defined parameters and the spatial location of a plurality of communicator devices contained in the communicator location database with real-time weather data to generate a plurality of individualized weather output signals; and transmitting each individualized weather output signal to a different communicator device.

32. The method of claim 31 wherein the communication network transmits individualized weather output signals to the particular communicator device via a mobile telephone network.

33. The method of claim 31 wherein at least one of the user identifier codes identifies a mobile phone.

34. The method of claim 31 wherein at least one of the user identifier codes identifies a pager.

35. The method of claim 31 wherein at least one of the user identifier codes identifies a laptop computer.

36. The method of claim 31 wherein at least one of the user identifier codes identifies a personal digital assistant.

37. The method of claim 31, further comprising the steps of:

compiling a data set of a plurality of spatial locations based on at least one weather content identifier; and outputting the data set to at least one of a plurality of vendors.

38. The method of claim 31, further comprising the steps of:

compiling a data set of a plurality of user profiles based on at least one weather content identifier;

outputting the data set to at least one of a plurality of vendors.

* * * * *